(12) United States Patent
Fodor et al.

(10) Patent No.: US 10,129,893 B2
(45) Date of Patent: Nov. 13, 2018

(54) NETWORK NODE AND METHOD FOR HANDLING CELLULAR AND D2D COMMUNICATIONS IN A WIRELESS COMMUNICATIONS NETWORK

(71) Applicant: Telefonaktiebolaget LM Ericsson (publ), Stockholm (SE)

(72) Inventors: Gabor Fodor, Hässelby (SE); Muhammad Kazmi, Bromma (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 192 days.

(21) Appl. No.: 15/030,740

(22) PCT Filed: Oct. 23, 2013

(86) PCT No.: PCT/SE2013/051235
§ 371 (c)(1),
(2) Date: Apr. 20, 2016

(87) PCT Pub. No.: WO2015/060756
PCT Pub. Date: Apr. 30, 2015

(65) Prior Publication Data
US 2016/0255669 A1    Sep. 1, 2016

(51) Int. Cl.
*H04W 76/10* (2018.01)
*H04B 7/04* (2017.01)
(Continued)

(52) U.S. Cl.
CPC ...... *H04W 72/0486* (2013.01); *H04B 7/0413* (2013.01); *H04B 7/0456* (2013.01);
(Continued)

(58) Field of Classification Search
CPC .. H04B 7/0413; H04B 7/0452; H04B 7/0456; H04W 72/082; H04W 72/0453;
(Continued)

(56) References Cited

U.S. PATENT DOCUMENTS

| | | | |
|---|---|---|---|
| 9,414,379 B2 * | 8/2016 | Zhu | H04L 25/0202 |
| 2010/0142633 A1 * | 6/2010 | Yu | H04B 7/0417 |
| | | | 375/260 |

(Continued)

FOREIGN PATENT DOCUMENTS

| | | |
|---|---|---|
| WO | 2010028690 A1 | 3/2010 |
| WO | 2010086715 A1 | 8/2010 |
| WO | 2013074462 A1 | 5/2013 |

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

(Continued)

*Primary Examiner* — Maharishi V Khirodhar
*Assistant Examiner* — Kenneth P Hunt
(74) *Attorney, Agent, or Firm* — Patent Portfolio Builders, PLLC (57) ABSTRACT

A method performed by a network node (110) for handling cellular communications and Device-to Device, D2D, communications of user equipments (121, 22, 123, 124) served by the network node (110) in a wireless telecommunications network (100) is provided. The network node determine, for at least one Physical Radio Resource, PRR, to be scheduled for both cellular and D2D communications of the user equipments (121, 122, 123, 124), a number of spatial streams to be used by the cellular and D2D communications of the user equipments (121, 122, 123, 124). The network node then transmits an indication of the number of spatial (Continued)

streams of said determined number of spatial streams to be used in D2D communication on the at least one PRR to at least one user equipment of at least one D2D pair of user equipments (123, 124) determined to be scheduled for D2D communication. A network node (110) for handling cellular communications and Device-to Device, D2D, communications of user equipments (121, 122, 123, 124), and a UE and method therein for configuring a Device-to-Device, D2D, communication with another user equipment (123, 124) are also provided.

22 Claims, 5 Drawing Sheets

(51) Int. Cl.
| | | |
|---|---|---|
| *H04W 72/04* | (2009.01) | |
| *H04W 72/08* | (2009.01) | |
| *H04W 76/14* | (2018.01) | |
| *H04B 7/0413* | (2017.01) | |
| *H04B 7/0456* | (2017.01) | |
| *H04W 52/38* | (2009.01) | |
| *H04W 84/04* | (2009.01) | |
| *H04W 92/18* | (2009.01) | |
| *H04B 7/0452* | (2017.01) | |

(52) U.S. Cl.
CPC ....... *H04W 52/383* (2013.01); *H04W 72/044* (2013.01); *H04W 72/0446* (2013.01); *H04W 72/0453* (2013.01); *H04W 72/082* (2013.01); *H04W 76/14* (2018.02); *H04B 7/0452* (2013.01); *H04W 84/042* (2013.01); *H04W 92/18* (2013.01)

(58) Field of Classification Search
CPC ........... H04W 72/0446; H04W 72/044; H04W 76/023; H04W 72/0486; H04W 52/383; H04W 84/042; H04W 92/18
USPC ........................................................ 370/329
See application file for complete search history.

(56) References Cited

U.S. PATENT DOCUMENTS

| | | | |
|---|---|---|---|
| 2010/0189048 A1 | 7/2010 | Baker et al. | |
| 2011/0275382 A1* | 11/2011 | Hakola | H04W 24/10 455/452.2 |
| 2011/0312331 A1 | 12/2011 | Hakola et al. | |
| 2012/0099540 A1* | 4/2012 | Doppler | H04J 11/0033 370/329 |
| 2012/0140842 A1* | 6/2012 | Vermani | H04B 7/0417 375/295 |
| 2012/0269149 A1* | 10/2012 | Okubo | H04W 72/1268 370/329 |
| 2012/0281774 A1* | 11/2012 | Lee | H04B 7/0452 375/260 |
| 2013/0095816 A1* | 4/2013 | Gerstenberger | H04W 72/0406 455/422.1 |
| 2014/0241192 A1* | 8/2014 | Kim | H04W 72/1226 370/252 |
| 2015/0043444 A1* | 2/2015 | Wei | H04B 7/0413 370/329 |
| 2015/0049736 A1* | 2/2015 | Liu | H04W 72/04 370/331 |
| 2016/0278095 A1* | 9/2016 | Fodor | H04B 7/0413 |

OTHER PUBLICATIONS

Anton-Haro, Carles et al., "Cross-Layer Scheduling for Multi-User MIMO Systems", IEEE Communications Magazine, Sep. 2006, 39-45.

Doppler, Klaus et al., "Device-to-Device Communication as an Underlay to LTE-Advanced Networks", IEEE Communications Magazine, Dec. 2009, 42-49.

Fodor, Gabor et al., "Design Aspects of Network Assisted Device-to-Device Communications", IEEE Communication Magazine, Mar. 2012, pp. 170-177.

Lin, Xingqin et al., "An Overview on 3GPP Device-to-Device Proximity Services", IEEE Communications Magazine, Sep. 26, 2013, 1-19.

\* cited by examiner

NETWORK NODE AND METHOD FOR HANDLING CELLULAR AND D2D COMMUNICATIONS IN A WIRELESS COMMUNICATIONS NETWORK

TECHNICAL FIELD

Embodiments herein relate to cellular and D2D communication in a wireless telecommunications network. In particular, embodiments herein relate to a network node and a method for handling cellular communications and D2D communications of user equipments served by the network node in a wireless telecommunications network.

BACKGROUND

In a typical cellular network, also referred to as a wireless communication network or system, User equipment, UEs, communicate via a Radio Access Network, RAN, to one or more core networks, CNs.

A user equipment is a mobile terminal by which a subscriber may access services offered by an operator's core network and services outside operator's network to which the operator's RAN and CN provide access. The user equipment may be for example communication devices such as mobile telephones, cellular telephones, smart phones, tablet computers or laptops with wireless capability. The user equipment may be portable, pocket-storable, hand-held, computer-comprised, or vehicle-mounted mobile devices, enabled to communicate voice and/or data, via the radio access network, with another entity, such as another mobile station or a server. The user equipments are enabled to communicate wirelessly in the cellular network. The communication may be performed e.g. between two user equipments, between a user equipment and a regular telephone and/or between the user equipment and a server via the RAN and possibly one or more CNs, comprised within the cellular network.

The RAN covers a geographical area which is divided into cell areas, with each cell area being served by a base station, e.g. a Radio Base Station, RBS, which in some RANs is also called eNodeB, eNB, NodeB, B node or network node. A cell area is a geographical area where radio coverage is provided by the radio base station at a base station site. Each cell area is identified by an identity within the local radio area, which is broadcast in the cell area. The base stations communicate over the air interface operating on radio frequencies with the user equipment within range of the base stations. It should be noted that a base station may serve one or more cells, also referred to as cell carriers, within its cell area.

Multi-User Multiple Input Multiple Output, MU-MIMO, is technology that may be implemented in a wireless telecommunications network. This allows distinct UEs to transmit and receive separate data streams to and from a central Access Point, AP, such as, e.g. an eNB in a Long Term Evolution, LTE, wireless communications network. When used for uplink transmissions, MU-MIMO may sometimes also be referred to as virtual MIMO. This is because multiple UEs, which potentially may only be equipped with a single transmit antenna, may effectively form a MIMO system similar to a single UE that is equipped with multiple transmit antennas. The difference is that, in MU-MIMO, the different transmit antennas may belong to distinct UEs.

MU-MIMO is attractive because it may take advantage of spatial separation of multiple UEs and multiple data streams. Thereby, it may also increase the spectral efficiency in the wireless communications network. Hence, MU-MIMO may also facilitate the reuse of radio resources at the expense of a minor increase of the intra-cell interference.

It follows that in a wireless communications network using MU-MIMO, an important issue is how to select the group of UEs that is to share radio resources at a given point in time. This UE grouping or MU-MIMO scheduling is often controlled by the Medium Access Control, MAC, layer in the network node. It is typically also not incorporated into any standard specifications, but nonetheless form an important proprietary part of MU-MIMO implementation in a wireless communications network.

Device-to-Device, D2D, communications of user equipments is also a technology that may be implemented in a wireless telecommunications network. This allows user equipments that are in the proximity of each other to discover one another, and establish a direct link to each other rather than a link via a network node. The setup of this direct link of the D2D communication may be assisted by the wireless communications network.

The direct link of a D2D communication between user equipments may also reuse the same radio resources that are used for cellular communications in the wireless communications network, either in the downlink (DL), uplink (UL) or both. Typically, D2D UEs use UL radio resources of the wireless communications network in their D2D communication, such as, e.g. UL PRBs or UL time slots, but may possibly also use DL radio resources, such as, e.g. the cellular DL spectrum or DL time slots.

This reuse of the same resource may lead to an increase of spectral efficiency in the wireless communications network, but also here at the expense of an increase of the intra-cell interference. From a resource reuse point of view, there is thus some similarity to the resource reuse in MU-MIMO, with the difference that in D2D communications the communicating UEs are distinct, whereas in MU-MIMO the separate UEs may all communicate with the same physical entity, such as, e.g. an LTE eNB.

In a wireless communications network supporting both MU-MIMO and D2D communications in its cellular spectrum, it is thus even more important to address the issue of how a network node should allocate radio resources and transmit powers to a set of UEs comprising both MU-MIMO and D2D users. In other words, the issue is how the network node should schedule a group of MU-MIMO and D2D UEs that share the same or overlapping resources for signal transmission in the wireless communications network. If not solved properly, this may lead to severe increases in interference, degradations in spectral efficiency and capacity, and/or problems with Quality-of-Service, QoS, at the UEs. It is clear that the conventional multiplexing in MU-MIMO systems, i.e. using diversity—spatial multiplexing trade off, is going to be affected by the presence of non-orthogonal D2D communications between UEs in the cellular spectrum.

SUMMARY

It is an object of embodiments herein to alleviate at least some of the effects indicated above caused by the sharing of resources in a wireless telecommunications network handling cellular and D2D communications.

According to a first aspect of embodiments herein, the object is achieved by a method performed by a network node for handling cellular communications and Device-to-Device, D2D, communications of user equipments served by the network node in a wireless telecommunications network. The network node determines, for at least one Physical Radio Resource, PRR, to be scheduled for both cellular and D2D communications of the user equipments, a number of spatial streams to be used by the cellular and D2D communications of the user equipments. The network node then transmits an indication of the number of spatial streams of said determined number of spatial streams to be used in D2D communication on the at least one PRR to at least one user equipment of at least one D2D pair of user equipments determined to be scheduled for D2D communication.

According to a second aspect of embodiments herein, the object is achieved by a network node for handling cellular communications and D2D communications of user equipments served by the network node in a wireless telecommunications network. The network node comprises processing circuitry. The processing circuitry is configured to determine, for at least one PRR, to be scheduled for both cellular and D2D communications of the user equipments, a number of spatial streams to be used by the cellular and D2D communications of the user equipments, and to transmit an indication of the number of spatial streams of said determined number of spatial streams to be used in D2D communication on the at least one PRR to at least one user equipment of the at least one D2D pair of user equipments determined to be scheduled for D2D communication.

According to a third aspect of embodiments herein, the object is achieved by a method performed by a user equipment for configuring a D2D communication with another user equipment in a wireless telecommunications network. The user equipment receives an indication of the number of spatial streams to be used in the D2D communication on at least one PRR that is scheduled for both cellular and D2D communications in the wireless communication network. Then, the user equipment configures the number of spatial streams to be used in the D2D communication using the received indication.

According to a fourth aspect of embodiments herein, the object is achieved by a user equipment for configuring a D2D communication with another user equipment in a wireless telecommunications network. The user equipment comprises processing circuitry. The processing circuitry is configured to receive an indication of the number of spatial streams to be used in the D2D communication on at least one PRR that is scheduled for both cellular and D2D communications in the wireless communication network. The processing circuitry is further configured to configure the number of spatial streams to be used in the D2D communication using the received indication.

By determining and signalling the number of spatial streams to be used in a D2D communication on at least one PRR for a D2D pair, the network node is enabled to possibly limit the number of spatial streams that may be used in the at least one PRR in the D2D communication when determining the D2D transmission mode of the D2D communication and scheduling it on said at least one PRR, by taking into account the number of user equipments that are currently scheduled for cellular communication on said at least one PRR, i.e. the number of spatial streams that are currently transmitted to the network node 110 by the user equipments communicating using cellular communication.

This provides for a way of limiting the effects of sharing radio resources, i.e. the same or overlapping PRR in a wireless communication network, between user equipments communicating using cellular communication and user equipments communicating using D2D communication.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
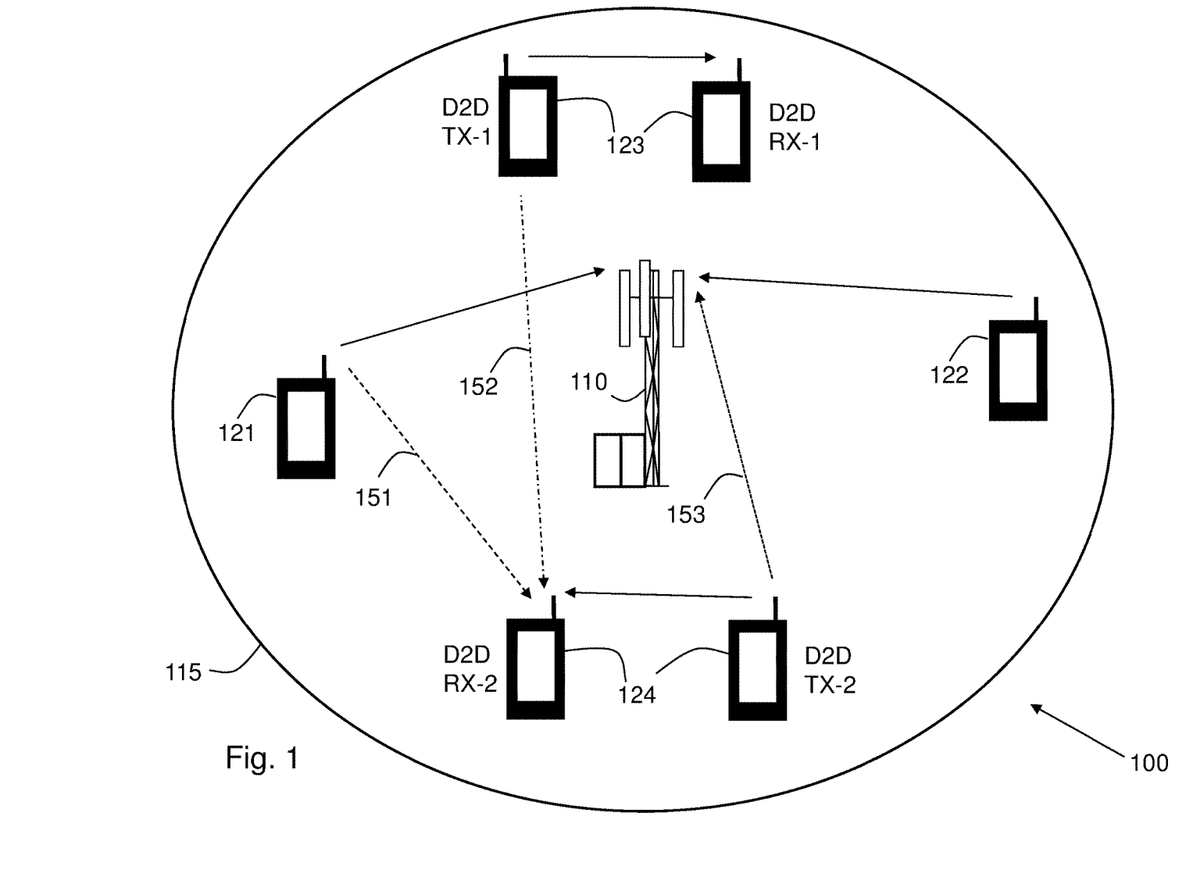
FIG. 1 is a schematic block diagram illustrating embodiments of a network node in a wireless communications network.

FIG. 1 depicts a wireless telecommunications network 100 in which embodiments herein may be implemented. In some embodiments, the wireless telecommunications network 100 may be a wireless communication network such as an LTE, LTE Advanced or any future 3GPP cellular network, or other any cellular network or system, in which both MIMO and D2D communications are supported in its cellular spectrum.

The wireless telecommunications system 100 comprises a network node 110. The network node 110 serves a cell 115. The network node 110 may in this example e.g. be an Base Station (BS), Base Transceiver Station (BTS), eNB, eNodeB, or a Home Node B, a Home eNode B, femto Base Station or home BS, pico BS, micro BS, Access Point (AP) or any other network unit capable to serve a user equipment or a machine type communication device in the wireless communications system 100. The network node 110 may also be a Base Station Controller (BSC) or Radio Network Controller (RNC). The network node 110 is configured to support both MIMO and D2D communications in the cell 115.

In FIG. 1, a number of user equipments are located within the cell 115. The user equipments are configured to communicate within the wireless telecommunications network 100 via the network node 110 over a radio link when present in the cell 115 served by the network node 110. Some of the user equipments in the cell 115 may also be capable of communicating directly with other user equipments using wireless D2D communication over direct D2D links, rather than via the network node 110.

Each of the number of user equipments may e.g. be a user equipment, mobile terminal or wireless terminal, a mobile phone, a computer (such as, e.g. a laptop, Personal Digital Assistants (PDAs) or tablet computer with wireless capability), a Machine-to-Machine (M2M) device or Machine Type Communication (MTC) device, a Laptop Mounted Equipment (LME/LEE), a USB connected device or any other radio network unit capable to communicate over a radio link in a wireless telecommunications network.

In this exemplified scenario, a first and second user equipment 121 and 122 are located within the cell 115. The first and second user equipment 121 and 122 communicate with the network node 110 using conventional cellular communication.

The first and second user equipment 121 and 122 may e.g. be Multiple User-MIMO, MU-MIMO, compatible user equipments. This means that the first and the second user equipment 121 and 122 may share the same radio resource, i.e. Physical Radio Resource, in the cellular spectrum in the cell 115. This is because the network node 110 may use interference cancellation capabilities of its MIMO capable receivers and the spatial separation of the first and the second user equipment 121 and 122 to distinguish multiple transmissions and spatial streams received from the first and the second user equipment 121 and 122.

Further, in this exemplified scenario, a first and a second D2D pair of user equipments 123 and 124 are also located in the cell 115. The first and second D2D pair may communicate in the cellular spectrum in the cell 115 using a direct D2D link. The radio resource in the cellular spectrum in the cell 115 used by these D2D communications may at least partly overlap with the radio resources used by the cellular communications of the first and second user equipment 121 and 122.

It should also be noted that a large number of user equipments may be located in the cell 115 of the network node 110, but for the sake of simplicity the embodiments may be described herein with reference to the scenario in FIG. 1. Thus, the first and second user equipments 121, 122 may be seen as two user equipments among more user equipments communicating with the network node 110 using conventional cellular communication. Also, the first and second D2D pair of user equipments 123, 124 may be seen as two D2D pairs of user equipments among more D2D pairs of user equipments located in the cell 115 of the network node 110.

Here, it may be assumed that the first and second D2D pair 123 and 124 may use UL radio resources in the wireless communications network 100 in their D2D communications, i.e. UL PRRs. However, it should be noted that is also possible for the first and second D2D pair 123 and 124 to use DL radio resources in the wireless communications network 100 in their D2D communications, i.e. DL PRRs.

As a consequence of having the first and second D2D pair 123 and 124 using UL radio resources for the direct D2D link, the following interference situations may arise (as illustrated in the exemplified scenario of FIG. 1):

First, cellular transmission from the first and second user equipments 121 and 122 to the network node 110 may cause interference to the receiving user equipments, D2D RX 1 and D2D RX 2, of the first and second D2D pairs 123 and 124. This interference 151 is illustrated by the dashed arrow in FIG. 1.

Secondly, D2D transmissions from the transmitting user equipment, D2D TX 1 and D2D TX 2, of the first and second D2D pair 123 and 124 may cause interference to the receiving user equipments, D2D RX 1 and D2D RX 2, of the first and second D2D pair 123 and 124. This interference 152 is illustrated by the dashed-dotted arrow in FIG. 1.

Thirdly, D2D transmissions from the transmitting user equipment, D2D TX 1 and D2D TX 2, of the first and second D2D pair 123 and 124 may cause interference to the network node 110 when e.g. receiving cellular transmissions from the first and second user equipments 121 and 122. This interference 153 is illustrated by the dotted arrow in FIG. 1.

In order to handle these interferences in the user equipments, the receiving user equipments, D2D RX 1 and D2D RX 2, of the first and second D2D pairs 123 and 124 may be configured to perform interference suppression, interference reduction, interference minimization interference cancellation or interference mitigation or similar operations. For example, first and second D2D pairs 123 and 124 may be configured to perform linear interference suppressing via e.g. a Minimum Mean Square Error, MMSE receiver, or non-linear subtractive-type of interference cancellation via e.g. a Minimum Mean Square Error—Successive Interference Cancellation, MMSE-SIC, receiver.

In order to handle these interferences in the network node 110, the network node 110 may be configured to use one of the following: a MMSE—Maximum Ratio Combining, MMSE-MRC, receiver; a MMSE—Interference Rejection Combining, MMSE-IRC, receiver; a pre-decoding based SIC receiver; or a Post-decoding based SIC receiver.

Considering the exemplified scenario in FIG. 1 as described above, the network node 110 must determine which user equipments communicating using cellular communication, e.g. the first and second user equipments 121 and 122, and which user equipments communicating using D2D communication, e.g. the first and second D2D pair 123 and 124, should be scheduled using the same or overlapping radio resources, i.e. the same or overlapping Physical Radio Resource, PRR. While the cellular spectrum efficiency increases when user equipments communicating using cellular communication and user equipments communicating using D2D communication are scheduled on the same or overlapping radio resources, the interference will also increase as described above. This is true for both intra-cell interference and inter-cell interference.

This issue is addressed by embodiments described herein by having the network node 110 determining and signalling the number of spatial streams to be used in a D2D communication on at least one PRR for a D2D pair. This enables the network node 110 to possibly limit the number of spatial streams that may be used on the at least one PRR in the D2D communication, while taking into account the number of user equipments that are currently scheduled for cellular communication on said at least one PRR, i.e. the number of spatial streams that are currently transmitted to the network node 110 by the user equipments communicating using cellular communication, when determining the D2D transmission mode of the D2D communication and scheduling it on said at least one PRR. This provides for a way of limiting the interference effects of sharing radio resources, i.e. the same or overlapping PRR in a wireless communication network, between user equipments communicating using cellular communication and user equipments communicating using D2D communication.

Embodiments are exemplified and explained in more detail below with reference to the exemplified scenario in FIG. 1.

It should be understood when reading the following that the term spatial stream is sometimes also interchangeably be referred to as simply stream, MIMO stream, MIMO or spatial layer, MIMO or spatial transmission layer (e.g. single layer transmission scheme, dual layer transmission scheme, etc), M-layer spatial multiplexing (e.g. single layer spatial multiplexing, dual layer spatial multiplexing, etc).

The user equipments may also recommend the number of streams, or transmission layers, which are best suited (e.g. leading to higher user throughput) for use in particular radio conditions. The recommendation sent by the user equipments to the network node is typically expressed in terms of rank indication, e.g. rank 1 and rank 2 may mean single stream and dual stream, respectively. The rank indication information allows the adaptation of the number of streams depending upon the radio conditions. Different spatial streams are typically transmitted by different transmit antennas.

Figure 2:
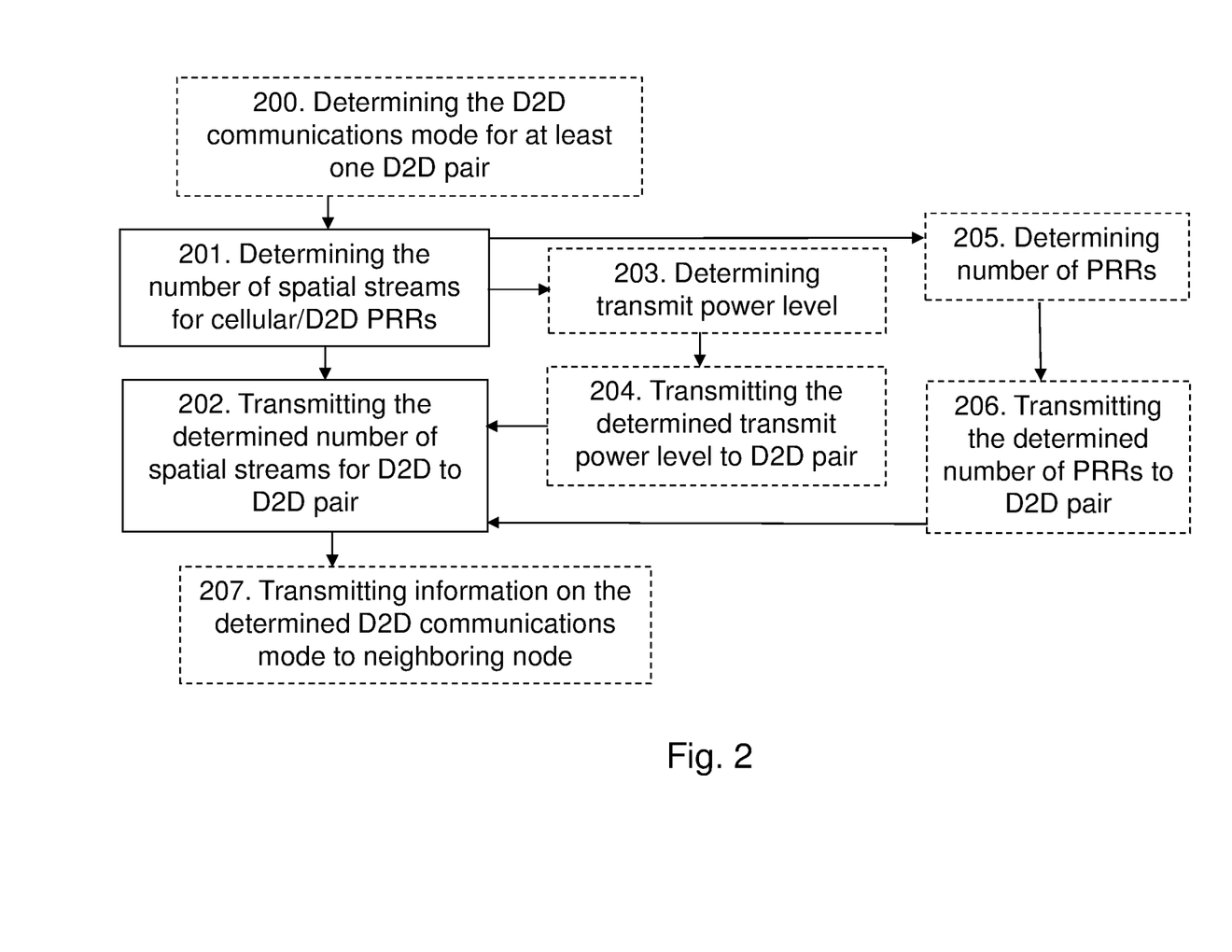
FIG. 2 is a flowchart depicting embodiments of a method in a network node.

Example of embodiments of a method performed by a network node 110 for handling cellular communications and D2D communications of user equipments 121, 122, 123, 124 served by the network node 110 in a wireless telecommunications network 100, will now be described with reference to the flowchart depicted in FIG. 2. FIG. 2 is an illustrated example of actions or operations which may be taken by a network node 110. The method may comprise the following actions.

Action 200

In this optional action, the network node 110 may determine a D2D transmission mode for the at least one pair of user equipments 123, 124 that is to be scheduled for D2D communication. This determination may be based on the number of user equipments that are currently scheduled for cellular communication on at least one PRR, i.e. the number of spatial streams that are to be transmitted to the network node 110 by the user equipments communicating using cellular communication on the at least one PRR. This may also be based on that the D2D pair, e.g. the first and second D2D pair of user equipments 123 and 124, is beyond a certain path loss value. Other variables that the network node 110 may consider when determining the D2D transmission mode is the number and distribution of D2D pairs of user equipments, the network node receiver type (e.g. MMSE-MRC-, MMSE-IRC-, pre-decoding or post-coding SIC receiver), the current interference between transmission from the user equipments, the received signal quality of transmission from the user equipments (e.g. Reference Signal Received Power, RSRP), or other measurements (e.g. QoS, Bit Error Rate BER, BLock Error Rate, BLER, Hybrid Automatic Repeat reQuest, HARQ-measurements or performance statistics) of the transmissions from the user equipments, etc.

The transmission mode for a D2D pair is typically determined for one Mode Selection, MS, period, i.e. around 500 ms. The D2D transmission mode may comprise one of the following:

scheduling the at least one D2D pair of user equipments 123, 124 for D2D communication on the at least one PRR to be scheduled for both cellular and D2D communications of the user equipments 121, 122, 123, 124; which means that D2D communication is allowed with resource sharing with other D2D pairs and with cellular user equipments.

scheduling the at least one D2D pair of user equipments 123, 124 for D2D communication on at least one PRR to be scheduled for D2D communications of the user equipments 121, 122, 123, 124, but not for cellular communications of the user equipments 121, 122, 123, 124; which means that D2D communication is allowed with resource sharing with other D2D pairs but not with cellular user equipments.

no scheduling of the at least one D2D pair of user equipments 123, 124 for D2D communication on any PRR, and instead scheduling the at least one D2D pair of user equipments 123, 124 for conventional cellular communication on at least one PRR; which means that D2D communication is not allowed for this D2D pair. In this case, the network node 110 may still allow resource sharing between the D2D transmitter (transmitting in cellular mode to the network node 110) and cellular user equipments.

no scheduling of the at least one D2D pair of user equipments 123, 124 for D2D communication on any PRR, and instead scheduling the at least one D2D pair of user equipments 123, 124 for conventional cellular communication on at least one orthogonal PRR; which means that D2D communication is not allowed for this D2D pair and no resource sharing with cellular user equipments will be applied.

Thus, it may be seen that the radio resource sharing between the user equipments communicating using cellular communication 121, 122 and the first and second D2D pair of user equipments 123 and 124 is enabled (i.e. the first transmission mode is selected) or disabled (i.e. any other transmission mode is selected).

In this way, the network node 110 may e.g. limit the number of PRRs that are available for the user equipments communicating using cellular communication 121, 122 in order to e.g. secure a radio resource pool for D2D communications for D2D pairs, such as, the first and second D2D pair of user equipments 123 and 124.

Action 201

In this action, the network node 110 determines, for at least one PRR to be scheduled for both cellular and D2D communications of the user equipments 121, 122, 123, 124, a number of spatial streams to be used by the cellular and D2D communications of the user equipments 121, 122, 123, 124. Thus, the user equipments communicating using cellular communication 121, 122 and the first and second D2D pair of user equipments 123 and 124 may be jointly scheduled on at least one PRR. This may be performed such that the sum, average or aggregate, of the inference remains at an acceptable level. This rather than scheduling the user equipments communicating using cellular communication 121, 122 and the first and second D2D pair of user equipments 123 and 124 by themselves, such as, in any other transmission mode than the first transmission mode. This may be performed such that the interference between the user equipments 121, 122, 123, 124 on the at least one PRR is below an interference threshold value. It should be noted that this determining of the number of spatial streams also may form a part of determining the transmission mode of D2D pair in Action 200.

In some embodiments, the determined number of spatial streams may be a maximum number of spatial streams. In this way, the network node 110 may e.g. limit the number of streams that are available for the user equipments communicating using cellular communication 121, 122 in order to e.g. secure a radio resource pool for D2D communications for D2D pairs, such as, the first and second D2D pair of user equipments 123 and 124.

In some embodiments, the determining of the number of spatial streams may be based on one or more of: the number of receiving antennas at the network node 110, the number of transmitting antennas at the network node 110, the type of radio receiver at the network node 110, the number of spatial streams of the transmissions of the user equipments 121, 122 to be scheduled for cellular communication on the at least one PRR, the number of spatial streams of the transmissions to the user equipments 121, 122 to be scheduled for cellular communication on the at least one PRR, one or more radio signal measurements performed by the network node 110 or by at least one user equipment of the at least one D2D pair of user equipments 123, 124, and the Degrees of Freedom, DoF, available at the network node 110 to manage the interference between the user equipments 121, 122, 123, 124.

These variables may be maintained by the network node 110 in a Scheduling Table, ST. In some embodiments, this ST may be updated on a time scale corresponding to the MS period. The ST may thus be used by the network node 110 to keep track of the DoF (used and still available) associated with each of the at least one PRR, the number of D2D pairs of user equipments scheduled on the at least one PRR, the number of spatial streams used by the D2D pairs of user equipments, the number of user equipments using cellular communication and the number of spatial streams per such user equipments, the current D2D transmission mode used by D2D pairs of user equipments on the at least one PRR, and possibly other measurement data, such as, e.g. user equipment CSI reports (e.g. recent D2D users equipments CQI, Rank Indication (RI), Precoding Matrix Indication (PMI), etc.), UE radio measurements (e.g. RSRP/RSRQ/SNR/SINR, the transmitted power of the user equipments, the user equipments power headroom reports, etc.), UL measurements performed by the network node 110 (e.g. transmitted carrier power, SNR, SINR, Received Interference Power (RIP), etc.), and/or further parameters, such as, e.g. the total interference measured on that PRR by the network node 110.

It should also be noted that an example of a DoF is the number of receive antennas at the network node for managing the interference.

Action 202

After determining the number of spatial streams to be used by the cellular and D2D communications of the user equipments 121, 122, 123, 124, the network node 110 transmits an indication of the number of spatial streams of said determined number of spatial streams to be used in D2D communication on the at least one PRR to at least one user equipment of at least one D2D pair of user equipments 123, 124 determined to be scheduled for D2D communication.

Action 203

In this optional action, the network node 110 may determine a transmit power level for the at least one PRR to be used in the D2D communication of the at least one D2D pair of user equipments 123, 124. This may be performed such that the interference between the user equipments 121, 122, 123, 124 on the at least one PRR is below an interference threshold value. Note that the determining of the transmit power level may be based on the same variables as described for the determining of the number of spatial streams in Action 201. It should also be noted that this determining of the transmit power level also may form a part of determining the transmission mode of D2D pair in Action 200.

In some embodiments, the determined transmit power value may be a maximum transmit power value. In this way, the network node 110 may e.g. limit the determined D2D transmit power levels on PRRs that are available for the user equipments communicating using cellular communication 121, 122. This may be performed such that the sum, or aggregate, of the inference remains at an acceptable level.

Action 204

In this optional action, after determining the transmit power level in Action 203, the network node 110 may transmit an indication of the determined transmit power level to the at least one user equipment of the at least one D2D pair of user equipments 123, 124.

Action 205

In this optional action, the network node 110 may determine the amount of the at least one PRR to be scheduled for both cellular and D2D communications of the user equipments 121, 122, 123, 124 based on the number of user equipments 121, 122 to be scheduled for cellular communications on the at least one PRR.

Note that the determining of the amount of the at least one PRR to be scheduled may be based on the same variables as described for the determining of the number of spatial streams in Action 201. It should also be noted that this determining of the transmit power level also may form a part of determining the transmission mode of D2D pair in Action 200.

Action 206

In this optional action, after determining the at least one PRR to be scheduled in Action 205, the network node 110 may transmit information about the precoding matrices indicating the determined at least one PRR to be scheduled for D2D communication to the at least one user equipment of the at least one D2D pair of user equipments 123, 124.

Action 207

In this optional action, after determining the D2D transmission mode in Action 200, the network node 110 may transmit information associated with the determined D2D transmission mode to another network node, e.g. a neighboring network node. This may be performed via X2 signalling.

Since the D2D transmission modes may be determined, the transmitted information may typically comprise of an identifier of the determined D2D transmission mode. In some embodiments, the network node 110 may also send a recommendation to one or more neighboring network nodes to use a certain D2D transmission mode in order to reduce inter-cell interference. The network node 110 may e.g. determine the recommended D2D transmission mode for use in a neighboring node depending upon e.g. the D2D transmission mode determined and used by the network node 110 itself, or the number of user equipments using cellular communication and/or number of D2D pairs of user equipments located in a cell border area between the cell served by the network node 110 and the neighboring node. In some embodiments, this information may also comprise the determined at least one PRR to be scheduled for both cellular and D2D communications of the user equipments 121, 122, 123, 124.

This enables a neighboring network node configure its own D2D transmission mode and radio resources, i.e. PRRs, for the cellular and D2D communications of the user equipments 121, 122, 123, 124 within its served cell. For example, the neighboring network node may create a set of radio resources that are partly or fully orthogonal to the sets of radio resources in the network node 110 in order to minimize inter-cell interference on the same radio resources.

In some embodiments, the cellular communications and the D2D communications of the user equipments 121, 122, 123, 124 are performed on the uplink, UL, PRRs. However, the cellular communications and the D2D communications of the user equipments 121, 122, 123, 124 may also be performed on the downlink, DL, PRRs. In some embodiments, the PRR referred to above may be any one of: a time-frequency resource, a channelization code, a Resource Element, RE, a time slot, a subframe, a radio frame, a Resource Block, RB, a Physical Resource Block, PRB, a Virtual RB, VRB, a group of RBs, a group of PRBs, or a group of VRBs.

The channelization code may be the case when the wireless communication network 100 is a Code-Division Multiple Access, CDMA, system.

In some embodiments, the cellular communication of the user equipments 121, 122, 123, 124 is Multi-User Multiple-Input-Multiple-Output, MU-MIMO, cellular communication. However, the same principle as described above may also be applied when the cellular communication of the user equipments 121, 122, 123, 124 is Single-User Multiple-Input-Multiple-Output, SU-MIMO, cellular communication.

In some embodiments, the determining and transmission of an indication of the number of spatial streams in Action 201-202, the determining and transmission of an indication of the transmit power level in Action 203-204, the determining and transmission of information about precoding matrices indicating the at least one PRR to be scheduled in Action 205-206, and/or determining D2D transmission mode in Action 200 may form part of a Mode Selection, MS, signalling to at least one user equipment of the at least one D2D pair of user equipments 123, 124. This is exemplified and illustrated in FIG. 3.

Figure 3:
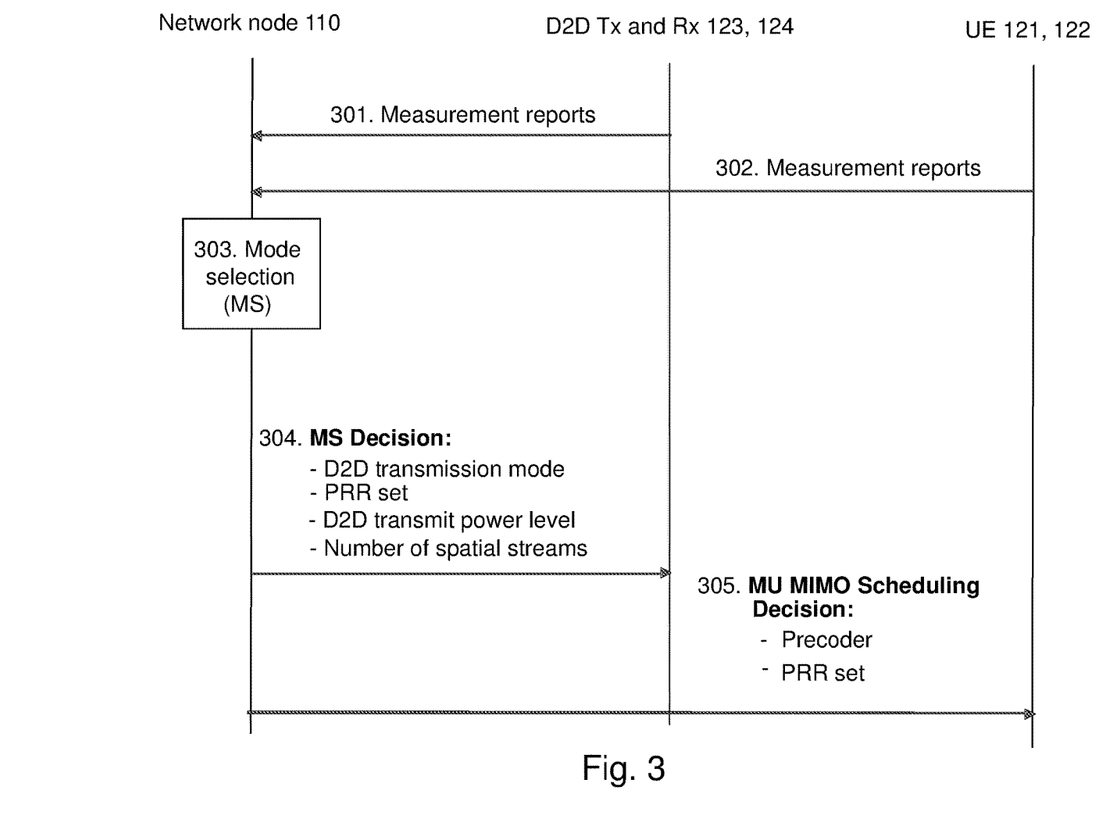
FIG. 3 is a signalling diagram depicting embodiments of a method in a network node.

Example of embodiments of a method performed by a network node 110 for handling cellular communications and D2D communications of user equipments 121, 122, 123, 124 served by the network node 110 in a wireless telecommunications network 100, will now be described with reference to the flowchart depicted in FIG. 3. FIG. 3 is an illustrated example of actions or operations which may be taken by a network node 110 as part of Mode Selection, MS, signalling to at least one user equipment of the at least one D2D pair of user equipments 123, 124. The method may comprise the following actions.

Actions 301-302

In this action, the network node 110 may receive measurement reports from the user equipments of the at least one D2D pair of user equipments 123, 124 and from the user equipments using cellular communication 121, 122, e.g. MU-MIMO user equipments.

This may be performed as part of existing signalling methods and protocols in order for the network node 110 to maintain control of the communication in the cell.

Even though not using cellular communication via the network node 110, the user equipments of the at least one D2D pair of user equipments 123, 124 may still continuously report Channel State Information (e.g. Channel Quality Information (CQI), Rank Indicator (RI), Precoding Matrix Indicator (PMI), etc.) and/or other radio measurements (e.g. path loss values, pilot strength values, etc.) using existing signalling methods and protocols. The user equipments of the at least one D2D pair of user equipments 123, 124 may for instance also report reference symbol related measurements using existing signalling methods and protocols, such as, e.g. Reference Signal Received Power (RSRP) and/or Reference Signal Received Quality (RSRQ).

The network node 110 may measure UL signal quality of the user equipments using cellular communication 121, 122, e.g. on Sounding Reference Signals (SRS), on Demodulation Reference Symbols (DMRS) or on any other reference signal transmitted by the user equipments using cellular communication 121, 122. These UL signal quality measurements and the distribution of the user equipments of the at least one D2D pair of user equipments 123, 124 and the user equipments using cellular communication 121, 122 may then be used by the network node 110 to evaluate the interference situation and eventually also for D2D transmission mode selection.

In case of using DL PRRs for the cellular communications and the D2D communications of the user equipments 121, 122, 123, 124, the network node 110 may instead obtain DL radio measurements of the above mentioned variables performed by the user equipments of the at least one D2D pair of user equipments 123, 124 and the user equipments using cellular communication 121, 122.

These variables may be maintained by the network node 110 in a Scheduling Table, ST, for the user equipments. In some embodiments, this ST may be updated on a time scale corresponding to the MS period, i.e. about every 500 ms.

Action 303

In this action, the network node 110 determines the Mode Selection (MS) signalling to the user equipments, i.e. the user equipments of the at least one D2D pair of user equipments 123, 124 and the user equipments using cellular communication 121, 122.

Here, the network node 110 may first determine a margin factor. The network node 110 may then use this margin factor when it determines the total number of D2D pairs of user equipments 123, 124 and user equipments using cellular communication 121, 122 that may simultaneously use a given PRR, and thus the D2D transmission mode of the D2D pairs of user equipments 123, 124. The network node 110 may also use this margin factor when it determines the number of spatial streams, the transmit power level and the specific PRRs to be used by the cellular and D2D communications of the user equipments 121, 122, 123, 124. The network node 110 may continuously adjust this margin factor depending on variables in the measurement reports from the user equipments in Actions 301-302.

For example, an upper limit for the sum of the spatial streams for the cellular communications of the user equipments 121, 122 and the spatial streams for the D2D communications of the D2D pairs of user equipments 123, 124 may be determined by the network node 110 as the number of the spatial streams of the receiving antennas of the network node 110 that is left when a number of spatial streams associated with the margin factor and/or a number of spatial streams associated with the measured overall interference, e.g. Rise over Thermal, RoT, has been deducted therefrom.

Here, a high value of the margin factor will lead to a higher number of antenna streams being deducted from the sum of spatial streams for the cellular communications of the user equipments 121, 122 and the D2D communications of the D2D pairs of user equipments 123, 124. Thus, this will result in a more conservative re-use of PRRs within the cell among the user equipments of the at least one D2D pair of user equipments 123, 124 and the user equipments using cellular communication 121, 122.

On the contrary, a low margin factor will lead to a lower number of antenna streams being deducted from the sum of spatial streams for the cellular communications of the user equipments 121, 122 and the D2D communications of the D2D pairs of user equipments 123, 124. Thus, this will result in a more aggressive re-use of PRRs within the cell among the user equipments of the at least one D2D pair of user equipments 123, 124 and the user equipments using cellular communication 121, 122.

While this margin factor may be dependent on one or more of the variables maintained in the ST for the user equipments, one example is when the margin factor is dependent on the performance of the user equipments of the at least one D2D pair of user equipments 123, 124 and the user equipments using cellular communication 121, 122, wherein the performance may be obtained in terms of any suitable metric, such as, e.g. BER, BLER, signal quality, etc.

This margin factor may then be associated with a number of antenna streams by e.g. being determined as a counting function. This counting function may first count the sum of all spatial data streams of the user equipments using cellular communication whose BER performance is over a certain BER target threshold, i.e. not acceptable. This sum may sum up all spatial streams that are used over a specific PRR. Then, the counting function may count the sum of the number of D2D spatial streams using the specific PRR whose BER performance is over a certain BER target threshold, i.e. not acceptable. The sum of the above mentioned sums may then be used as the margin factor. In this case, the margin factor will increase as the performance of the performance of the user equipments of the at least one D2D pair of user equipments 123, 124 and the user equipments using cellular communication 121, 122, degrades.

The margin factor may further be adjusted depending upon the D2D transmission mode used for radio resource sharing used by one or more neighboring network nodes and/or a received indication by the network node 110 about the D2D transmission recommended by one or more neighboring network nodes.

In some embodiments, the network node 110 may determine the achievable data rates of the multiple links for each D2D transmission mode according to its network node receiver capability in terms of interference mitigation. The achievable data rates of each D2D transmission mode may then be compared to one or more performance metrics, e.g. BER, BLER, signal quality, etc.

A certain D2D transmission mode may be determined when the one or more performance metrics meet a certain criterion. The calculation of an achievable data rate for each of the multiple links may be based on the link's SINR. For example, in the UL of LTE, the link SINR may be expressed as, Eq. 1:

$$SINR = \left[\frac{1}{K}\sum_{k=0}^{K-1} [1 + \Gamma(k)]^{-1}\right]^{-1}, \quad \text{(Eq. 1)}$$

wherein K is the Discrete Fourier Transform, DFT, size $\Gamma(k)$ is the SINR at subcarrier k.

Here, $\Gamma(k)$ may be determined by the frequency-domain equalization weight W(k), the channel response H(k), and the total impairment covariance $R_{I+N}(k)$, in accordance with Eq. 2:

$$\Gamma(k) = \frac{W(k)^H H(k) H^H(k) W(k)}{W(k)^H R_{I+N}(k) W(k)} \quad \text{(Eq. 2)}$$

Note that the vectors W(k) and H(k) has one component per receive antenna of the network node 110. Note also that H(k) may include a MIMO precoder used at the transmitter, e.g. the user equipments 121, 122, 123, 124.

In case the network node 110 comprises MMSE-MRC and MMSE-IRC receivers, $W(k)=(R_{I+N}+H(k)H^H(k))^{-1}H(k)$. However, with MMSE-MRC receivers, the total impairment covariance is approximately an identity matrix, whereas with MMSE-IRC receivers, the spatial correlations, i.e. off-diagonal terms, in the impairment covariance is exploited.

The total impairment covariance $R_{I+N}(k)$ includes contribution from other links of the user equipments of the at least one D2D pair of user equipments 123, 124 and the user equipments using cellular communication 121, 122. However, in case the network node 110 comprises a SIC receiver, some of the interference caused by these other links may be removed, e.g. if a D2D link is detected and decoded data is close to error free, the network node 110 may exclude it in the total impairment covariance $R_{I+N}(k)$.

The SINR calculation may be performed by the network node 110 for each D2D link under consideration for a given D2D transmission mode. The calculated SINR may also be mapped to its achievable data rate. The example above aids in illustrating that a supportable data rate may be determined by the network node 110 for each D2D link under consideration for a particular D2D transmission mode.

According to one example, when the network node 110 is to determine whether a particular D2D link, e.g. between at least one D2D pair of the D2D pairs of user equipments 123, 124, is to be allowed to share radio resources with a number of user equipments using cellular communication, e.g. the user equipments 121, 122, the network node 110 may first determine the achievable data rates for the number of user equipments using cellular communication, e.g. the user equipments 121, 122, without any D2D communications. This may be performed according to the receiver type of the network node 110 as described above, e.g. ($R_{1A}$, $R_{2A}$). Then, when a D2D link has been determined to share the radio resources with the number of user equipments using cellular communication, e.g. the user equipments 121, 122, the data rates may be calculated again, e.g. ($R_{1B}$, $R_{2B}$, $R_{3B}$). Note that here, the subscripts 1 and 2 are used for user equipments using cellular communication and the subscript 3 are used for the at least one D2D pair of the D2D pairs of user equipments 123, 124.

The network node 110 may then determine a performance metric based on these data rate to be used in determination. This performance metric may e.g. be the sum rate of these data rates. For example, if $R_{1B}+R_{2B}+R_{3B}>R_{1A}+R_{2A}$, then the radio resources should be allowed to be shared.

Alternatively, or in addition to the previous example, the performance metric may be the individual data rate of the user equipments using cellular communication. For example, each of the individual data rate of the user equipments using cellular communication may need to meet a certain target rate $R_t$ if the D2D link is to be allowed to share radio resources, e.g. $R_{1B}>R_t$ and $R_{2B}>R_t$.

In some embodiments, when the network node 110 comprises a SIC receiver, the network node 110 is able to cancel out the D2D link completely in its calculations. This may be possible when a D2D transmitter, e.g. a D2D TX of at least one D2D pair of the D2D pairs of user equipments 123, 124, desires to communicate with its D2D receiver, e.g. a D2D RX of at least one D2D pair of the D2D pairs of user equipments 123, 124, at a data rate that is lower than the supportable data rate according to the link between the D2D transmitter and the network node 110. In this case, there is no, or minimal, impact on the user equipments using cellular communication.

In some embodiments, this data rate calculation may be performed by the network node 110 on a longer time scale than the MS period when e.g. the user equipments 121, 122, 123, 124, are of low mobility. In some embodiments, the network node 110 may average the calculated data rates over time in order to allow more long-term statistics, such as, e.g. path loss, angles of arrival, to be considered by the network node 110 in the determination.

When the margin factor or data rates has been applied as indicated above, i.e. when determining the D2D transmission mode, the number of spatial streams, the transmit power level and the specific PRRs to be used by the cellular and D2D communications of the user equipments 121, 122, 123, 124, the network node 110 may update its ST.

In some embodiments, the user equipments 121, 122, 123, 124, may also send an explicit request for certain entries in the ST. For example, a user equipments in at least one D2D pair 123, 124, may request the network node 110 to increase the transmit power level for its D2D communication, or a user equipments in at least one D2D pair 123, 124, may request to increase the maximum number of spatial streams that it may use for transmission in its D2D communication, or a user equipments in at least one D2D pair 123, 124, may explicitly refrain from entering a D2D communication.

Actions 304-305

In this action, the network node 110 may continuously signal, i.e. signal at each MS period, a specific portion of the information found in its Scheduling Table (ST) for the user equipments, i.e. the user equipments of the at least one D2D pair of user equipments 123, 124 and the user equipments using cellular communication 121, 122.

Most significantly, the network node 110 may perform the MS signalling such that the MS signalling comprises the number of spatial streams allowed to be used by the at least one D2D pair of user equipments 123, 124. Further, the MS signalling may comprise the specific set of precoding matrices indicating the at least one PRR to be scheduled, and the transmit power level that is available for the D2D communication of the at least one D2D pair of user equipments 123, 124 until the next MS period. The MS signalling of the network node 110 may also comprise the determined D2D transmission mode of the D2D communication of the at least one D2D pair of user equipments 123, 124.

The network node 110 may also transmit a scheduling decision to the user equipments using cellular communication 121, 122, which may comprise precoders and precoding matrices indicating the at least one PRR to be scheduled for the cellular communication of the user equipments 121, 122. Note that a precoder may be applied to transmit signals across multiple antennas. Alternatively, a precoder may be used to transform a signal to a signal subspace.

Figure 4:
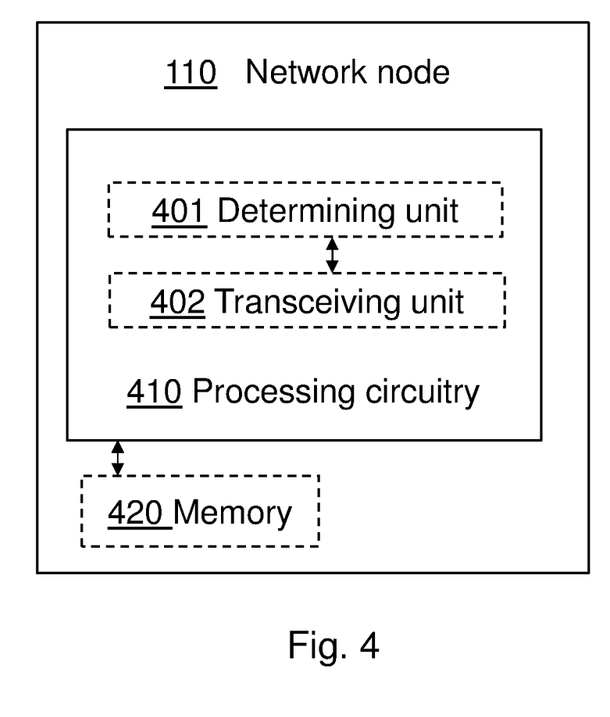
FIG. 4 is a block diagram depicting embodiments of a network node.

To perform the method actions in the network node 110 for handling cellular communications and D2D communications of user equipments 121, 122, 123, 124 served by the network node 110 in a wireless telecommunications network 100, the network node 110 may comprise the following arrangement depicted in FIG. 4. FIG. 4 shows a schematic block diagram of embodiments of a network node 110.

The network node 110 comprises a processing unit 410, which may also be referred to as processing circuitry. The processing unit 410 in the network node 110 may comprise, or be configured to be connected to, a determining unit 401 and a transceiving unit 402. The determining unit 401 is configured to determine for at least one PRR to be scheduled for both cellular and D2D communications of the user equipments 121, 122, 123, 124, a number of spatial streams to be used by the cellular and D2D communications of the user equipments 121, 122, 123, 124. The transceiving unit 402 is configured to transmit an indication of the number of spatial streams of the determined number of spatial streams to be used in D2D communication on the at least one PRR to at least one user equipment of the at least one D2D pair of user equipments 123, 124 determined to be scheduled for D2D communication.

In some embodiments, the determining unit 401 may be configured to determine a transmit power level for the at least one PRR to be used in the D2D communication of the at least one pair of user equipments 123, 124. In this case, the transceiving unit 402 may be configured to transmit an indication of the determined transmit power level to the at least one user equipment of the at least one D2D pair of user equipments 123, 124. In some embodiments, the determining unit 401 may be configured to determine the number of the at least one PRR to be scheduled for both cellular and D2D communications of the user equipments 121, 122, 123, 124 based on the number of user equipments 121, 122 to be scheduled for cellular communications on the at least one PRR. In this case, the transceiving unit 402 may be configured to transmit information about the precoding matrices indicating the at least one PRR to be scheduled for D2D communication to the at least one user equipment of the at least one D2D pair of user equipments 123, 124.

In some embodiments, the determining unit 401 may be configured to determine the number of spatial streams, the transmit power level and/or the precoding matrices indicating the at least one PRR to be used by the cellular and D2D communications of the user equipments 121, 122, 123, 124 such that the interference between the user equipments 121, 122, 123, 124 on the at least one PRR is below an interference threshold value. In some embodiments, the determined number of spatial streams may be a maximum number of spatial streams, and the determined transmit power value may be a maximum transmit power value.

In some embodiments, the determining unit 401 may be configured to determine the number of spatial streams to be used by the cellular and D2D communications of the user equipments 121, 122, 123, 124 based on one or more of: the number of receiving antennas at the network node 110, the number of transmitting antennas at the network node 110, the type of radio receiver at the network node 110, the number of spatial streams of the transmissions of the user equipments 121, 122 to be scheduled for cellular communication on the at least one PRR, the number of spatial streams of the transmissions to the user equipments 121, 122 to be scheduled for cellular communication on the at least one PRR, one or more radio signal measurements performed by the network node 110 or by at least one user equipment of the at least one D2D pair of user equipments 123, 124, and the DoF available at the network node 110 to manage the interference between the user equipments 121, 122, 123, 124.

In some embodiments, the transceiving unit 402 may be configured to transmit the indication of the number of spatial streams, the indication of the transmit power level and/or information about the precoding matrices indicating the at least one PRR, as part of a MS signalling for the at least one pair of user equipments 123, 124.

The embodiments herein for handling cellular communications and D2D communications of user equipments 121, 122, 123, 124 in the network node 110 may be implemented through one or more processors, such as, the processing unit 410 in the network node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick or other storage mediums. The computer program code may e.g. be provided as program code in the network node 110 or on a server and downloaded to the network node 110.

The network node 110 may further comprise a memory 420 comprising one or more memory units. The memory

420 may be arranged to be used to store data, such as, e.g. Scheduling Table (ST), measurements reports from user equipments, etc., needed to perform the methods described herein when being executed in the network node 110.

Those skilled in the art will also appreciate that the processing unit 410 and the memory 420 described above may refer to a combination of analog and digital circuits, and/or one or more processors configured with software and/or firmware, e.g. stored in a memory, that when executed by the one or more processors such as the processing unit 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
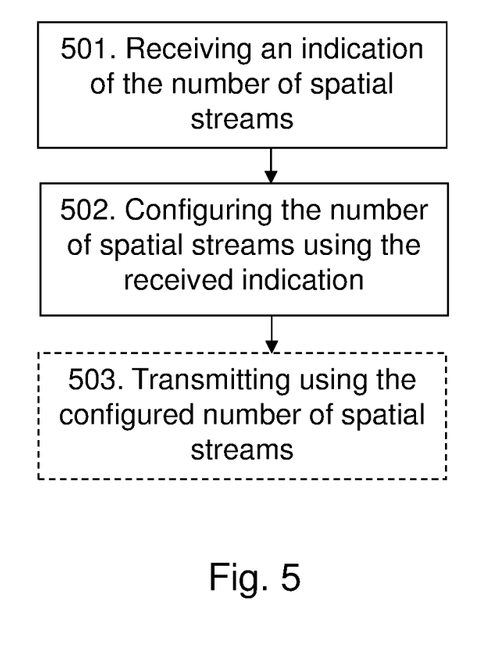
FIG. 5 is a flowchart depicting embodiments of a method in a user equipment.

Example of embodiments of a method performed by a user equipment 123, 124 for configuring a D2D communication with another user equipment 123, 124 in a wireless telecommunications network 100, will now be described with reference to the flowchart depicted in FIG. 5. FIG. 5 is an illustrated example of actions or operations which may be taken by at least one user equipment in a D2D pair of user equipments 123, 124. The method may comprise the following actions.

Action 501

The user equipment 123, 124 may receive an indication of the number of spatial streams to be used in the D2D communication on at least one PRR that is scheduled for both cellular and D2D communications in the wireless communication network 100. In some embodiments, the indication may also comprise one or more of: an indication of the transmit power level for the D2D communication, information about precoders and precoding matrices indicating the at least one PRR to be used in the D2D communication, and/or the D2D transmission mode of the D2D communication. The indication(s) above may be received as part a Mode Selection, MS, signalling.

Action 502

After receiving the indication, the user equipment 123, 124 configures the number of spatial streams to be used in the D2D communication using the received indication. In some embodiments, the user equipment 123, 124 may also be configure to use the indicated transmit power level, the precoders and precoding matrices indicating the at least one PRR to be used in the D2D communication, and/or the D2D transmission mode of the D2D communication when configuring the D2D communication with the other user equipment.

Action 503

In this optional action, the user equipment may transmit D2D data over the D2D communication using the configured number of spatial streams.

Figure 6:
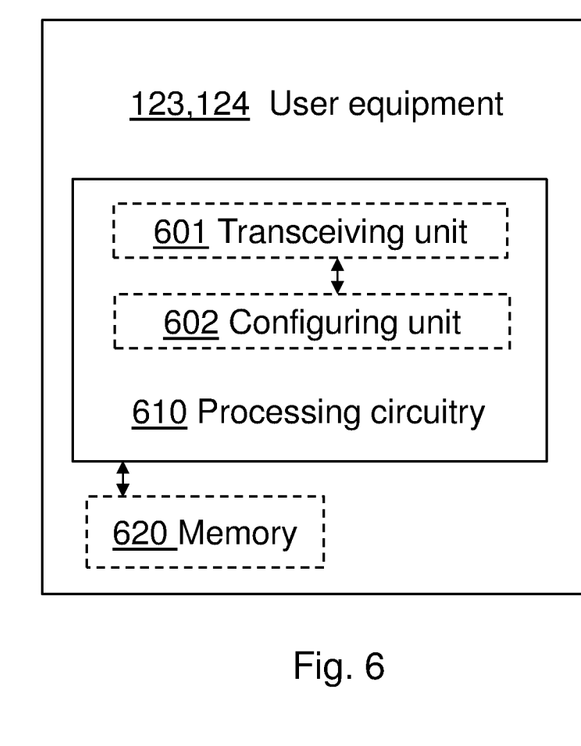
FIG. 6 is a block diagram depicting embodiments of a user equipment.

To perform the method actions in the user equipment 123, 124 for configuring a D2D communication with another user equipment in a wireless telecommunications network 100, the user equipment 123, 124 may comprise the following arrangement depicted in FIG. 6. FIG. 6 shows a schematic block diagram of embodiments of a user equipment in a D2D pair of user equipments 123, 124.

The user equipment 123, 124 comprises a processing unit 610, which may also be referred to as processing circuitry. The processing unit 610 in the network node 110 may comprise, or be configured to be connected to, a transceiving unit 601 and a configuring unit 602. The transceiving unit 601 is configured to receive an indication of the number of spatial streams to be used in the D2D communication on at least one PRR that is scheduled for both cellular and D2D communications in the wireless communication network 100. The configuring unit 602 is configured to configure the number of spatial streams to be used in the D2D communication using the received indication. In some embodiments, the transceiving unit 601 may be configured to transmit D2D data over the D2D communication using the configured number of spatial streams.

The embodiments herein for configuring a D2D communication with another user equipment 123, 124 in the user equipment 123, 124 may be implemented through one or more processors, such as, the processing unit 610 in the user equipment 123, 124 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the user equipment. One such carrier may be in the form of a CD ROM disc. It is however feasible with other data carriers such as a memory stick or other storage mediums. The computer program code may e.g. be provided as program code in the user equipment or on a server and downloaded to the user equipment.

The user equipment may further comprise a memory 620 comprising one or more memory units. The memory 620 may be arranged to be used to store data, such as, e.g. the indication of the number of spatial streams, etc., needed to perform the methods described herein when being executed in the user equipment.

Those skilled in the art will also appreciate that the processing unit 610 and the memory 620 described above may refer to a combination of analog and digital circuits, and/or one or more processors configured with software and/or firmware, e.g. stored in a memory, that when executed by the one or more processors such as the processing unit 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that a problem with existing solutions, including standardized and proprietary techniques for D2D and MU-MIMO scheduling is that the available solutions do not take into account that D2D pairs using underlay D2D technology, e.g. the user equipments of the at least one D2D pair of user equipments 123, 124, and multiple MU-MIMO users, e.g. the user equipments using cellular communication 121, 122, may simultaneously be present in the wireless communications network 100, such as, e.g. a 3GPP LTE system. Specifically, existing D2D and MU-MIMO PHY and Medium Access Control (MAC) layer procedures do not provide a solution for user grouping, resource sharing and interference management between MU-MIMO and D2D users. The embodiments described herein provide a useful and appropriate solution to this problem.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for handling cellular communications and Device-to-Device (D2D) communications of user equipments served by the network node in a wireless telecommunications network, the method comprising:
    determining, for at least one Physical Radio Resource (PRR) to be scheduled for both cellular and D2D communications of the user equipments, a maximum number of spatial streams that may be used by the cellular and D2D communications of the user equipments; and
    transmitting an indication of a maximum number of spatial streams, of said determined maximum number of spatial streams, that may be used in D2D communication on the at least one PRR, to at least one user equipment of at least one D2D pair of user equipments determined to be scheduled for the D2D communication.

2. The method of claim 1, further comprising:
    determining a transmit power level for the at least one PRR to be used in the D2D communication of the at least one D2D pair of user equipments; and
    transmitting an indication of the determined transmit power level to the at least one user equipment of the at least one D2D pair of user equipments.

3. The method of claim 1, wherein the determining is performed such that interference between the user equipments on the at least one PRR is below an interference threshold value.

4. The method of claim 2, wherein the determined transmit power level is a maximum transmit power value.

5. The method of claim 1, wherein the determining is based on one or more of:
    a number of receiving antennas at the network node;
    a number of transmitting antennas at the network node;
    a type of radio receiver at the network node;
    a number of spatial streams of transmissions of the user equipments to be scheduled for cellular communication on the at least one PRR;
    a number of spatial streams of transmissions to the user equipments to be scheduled for cellular communication on the at least one PRR;
    one or more radio signal measurements performed by the network node or by the at least one user equipment of the at least one D2D pair of user equipments; and
    Degrees of Freedom (DoF) available at the network node to manage interference between the user equipments.

6. The method of claim 1, wherein the cellular communication of the user equipments is Multi-User Multiple-Input-Multiple-Output (MU-MIMO) cellular communication.

7. The method of claim 1, wherein the cellular communication of the user equipments is Single-User Multiple-Input-Multiple-Output (SU-MIMO) cellular communication.

8. The method of claim 6, wherein the cellular communications and the D2D communications of the user equipments are performed on an uplink PRR or on a downlink PRR.

9. The method of claim 1, further comprising determining a D2D transmission mode for the at least one D2D pair of user equipments that is to be scheduled for the D2D communication, wherein the D2D transmission mode comprises one of:
    scheduling the at least one D2D pair of user equipments for the D2D communication on the at least one PRR to be scheduled for both cellular and D2D communications of the user equipments;
    scheduling the at least one D2D pair of user equipments for the D2D communication on at least one PRR to be scheduled for D2D communications of the user equipments, but not for cellular communications of the user equipments; and
    no scheduling of the at least one D2D pair of user equipments for the D2D communication on any PRR, and instead scheduling the at least one D2D pair of user equipments for conventional cellular communication on at least one PRR.

10. The method of claim 9, further comprising transmitting information associated with the determined D2D transmission mode to another network node.

11. The method of claim 1, wherein the transmitting is part of a Mode Selection (MS) signaling to at least one user equipment of the at least one D2D pair of user equipments.

12. The method of claim 1, wherein the PRR is one of: a time-frequency resource; a channelization code; a Resource Element (RE); a time slot; a subframe; a radio frame; a Resource Block (RB); a Physical Resource Block (PRB); a Virtual RB (VRB); a group of RBs; a group of PRBs; or a group of VRBs.

13. A network node for handling cellular communications and Device-to-Device (D2D) communications of user equipments served by the network node in a wireless telecommunications network, the network node comprising:
    processing circuitry configured to determine, for at least one Physical Radio Resource Block (PRR) to be scheduled for both cellular and D2D communications of the user equipments, a maximum number of spatial streams to be used by the cellular and D2D communications of the user equipments, and to transmit an indication of a maximum number of spatial streams, of said determined maximum number of spatial streams, that may be used in D2D communication on the at least one PRR, to at least one user equipment of at least one D2D pair of user equipments determined to be scheduled for the D2D communication.

14. The network node of claim 13, wherein the processing circuitry is further configured to determine a transmit power level for the at least one PRR to be used in the D2D communication of the at least one D2D pair of user equipments, and to transmit an indication of the determined transmit power level to the at least one user equipment of the at least one D2D pair of user equipments.

15. The network node of claim 13, wherein the processing circuitry is further configured to determine the maximum number of spatial streams that may be used by the cellular and D2D communications of the user equipments such that interference between the user equipments on the at least one PRR is below an interference threshold value.

16. The network node of claim 14, wherein the determined transmit power level is a maximum transmit power value.

17. The network node of claim 13, wherein the processing circuitry is further configured to determine the maximum number of spatial streams that may be used by the cellular and D2D communications of the user equipments based on one or more of:
- a number of receiving antennas at the network node,
- a number of transmitting antennas at the network node,
- a type of radio receiver at the network node;
- a number of spatial streams of transmissions of the user equipments to be scheduled for cellular communication on the at least one PRR,
- a number of spatial streams of transmissions to the user equipments to be scheduled for cellular communication on the at least one PRR,
- one or more radio signal measurements performed by the network node or by the at least one user equipment of the at least one D2D pair of user equipments; and
- Degrees of Freedom (DoF) available at the network node to manage interference between the user equipments.

18. The network node of claim 13, wherein the processing circuitry is further configured to transmit the indication of the maximum number of spatial streams as part of a Mode Selection (MS) signaling for the at least one D2D pair of user equipments.

19. A method performed by a user equipment for configuring a Device-to-Device (D2D) communication with another user equipment in a wireless telecommunications network, the method comprising:
- receiving an indication of a maximum number of spatial streams that may be used in the D2D communication on at least one Physical Radio Resource (PRR) that is scheduled for both cellular and D2D communications in the wireless telecommunications network; and
- configuring spatial streams up to the indicated maximum number that may be used in the D2D communication using the received indication.

20. The method of claim 19, further comprising transmitting D2D data over the D2D communication using the configured number of spatial streams.

21. A user equipment for configuring a Device-to-Device (D2D) communication with another user equipment in a wireless telecommunications network, the user equipment comprising:
- processing circuitry configured to receive an indication of a maximum number of spatial streams that may be used in the D2D communication on at least one Physical Radio Resource (PRR) that is scheduled for both cellular and D2D communications in the wireless telecommunications network, and to configure spatial streams up to the indicated maximum number that may be used in the D2D communication using the received indication.

22. The method of claim 21, wherein the processing circuitry is further configured to transmit D2D data over the D2D communication using the configured number of spatial streams.

* * * * *